(No Model.)

E. G. CAMERON.
STOVE PIPE JOINT AND THIMBLE LOCK.

No. 356,706. Patented Jan. 25, 1887.

Witnesses
C. O. Davis
W. D. Alexander

Inventor
E. G. Cameron
By his Attorney
C. H. Alexander

United States Patent Office.

EZRA G. CAMERON, OF CHARLOTTE, MICHIGAN, ASSIGNOR OF ONE-HALF TO DAVID M. FOOTE, OF SAME PLACE.

STOVE-PIPE JOINT AND THIMBLE-LOCK.

SPECIFICATION forming part of Letters Patent No. 356,706, dated January 25, 1887.

Application filed July 21, 1886. Serial No. 208,609. (No model.)

*To all whom it may concern:*

Be it known that I, EZRA G. CAMERON, a citizen of the United States, residing at Charlotte, in the county of Eaton and State of Michigan, have invented certain new and useful Improvements in Stove-Pipe Joints and Thimble-Locks, of which the following is a specification, reference being had therein to the accompanying drawings.

My invention relates to stove-pipe couplings and locks, its object being to secure the stove-pipe within the crack or opening through the wall of the building in which they are to be used, as also to connect the several joints together in a secure and economical manner, as will be hereinafter fully set forth.

Figure 1:
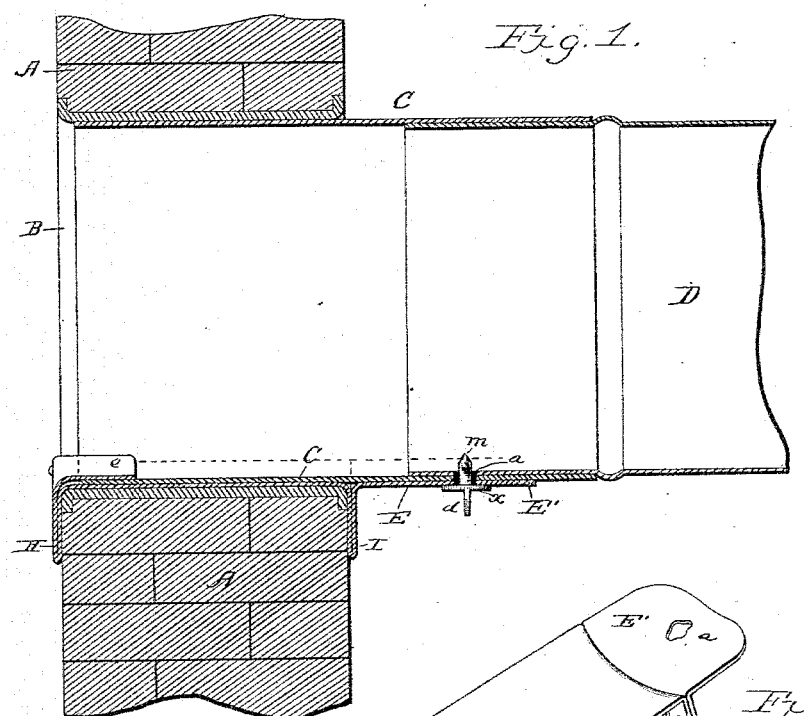
Figure 2:
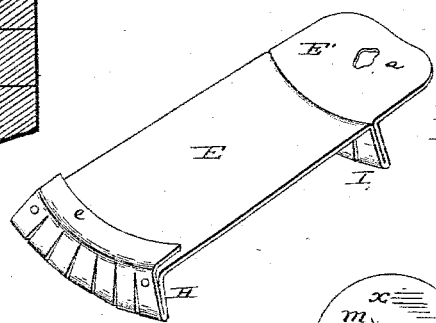
Figure 3:
Figure 4:
Figure 6:
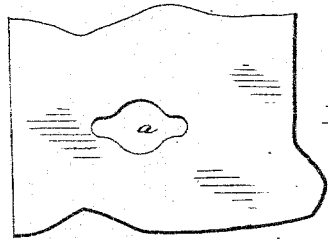
Figure 5:
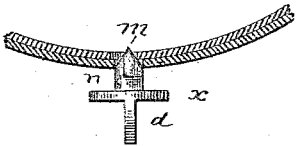

In the accompanying drawings, making part of this specification, Figure 1 represents a longitudinal section of the connecting-pipes with section of masonry. Fig. 2 is a perspective of a device to which the first section of pipe is to be connected. Figs. 3, 4, 5, and 6 are detached views of several parts, showing the mode of connecting the parts and their construction.

In the figures, A represents the masonry or brick-work surrounding the opening in which the pipe is to be inserted.

B represents a thimble, flanged at each end, which is built in with the masonry and permanently held there.

E is a sheet-metal plate, concave on its upper surface, the outer portion of which plate is longitudinally slitted and then bent thrice to form the curved external flange H and clamping-flange e, and its under portion similarly slitted and bent thrice to form the curved external flange, I, and the continuation of the curved main body E, in the same cylindrical plane therewith.

The flanges formed by the bends in the plate E are marked H and I. These flanges are sufficiently far apart to fit snugly over the two ends of the thimble B, as seen in Fig. 1. In the ring E is a diamond-shaped or oval opening, a.

C represents a section of pipe, the inner end of which, after passing into the thimble and over the plate E, catches under the flange e of the plate. This section is also provided with an opening to correspond with the shape of that in ring E'.

D represents another section of pipe, which enters the outer end of section C. It is also provided with a similar hole or opening to those above referred to.

d represents a key-bolt for the purpose of securing the parts together. This bolt has an annular flange, x, a shank, n, and an arrow flanged head, m. The end of this bolt may be arrow, diamond, or oval shaped to correspond with the opening a, through which it has to enter in securing the parts together. A quarter-turn of the bolt will bring its flanges in the position represented fully in Fig. 4, whereby all of the parts are clamped securely together. The flange x extends over the openings in the sections, so as to prevent escape of smoke or soot.

As many sections of pipe may be connected together as desirable by means of bolts shaped as the one represented and through similarly-shaped holes.

On great advantage in the pointed arrow-shaped bolt is it readily enters the openings in the sections and draws them together or moves them to proper position. This is very desirable on account of the quickness and accuracy with which the sections can be joined.

Having thus fully described my invention, what I claim as new, and desire to secure by Letters Patent, is—

1. The combination, with the thimble B, of the stove-pipe section, and the concave section E, formed with flanges H I, and a retaining-fastening securing it to the stove-pipe section, substantially as described.

2. The retaining-plate E, concave on its upper surface, provided with flanges H I, formed by slitting and bending the metal, as described, and provided with an aperture adapted to receive a suitable fastening, as specified.

In testimony whereof I affix my signature in presence of two witnesses.

EZRA G. CAMERON.

Witnesses:
DAVID M. FOOTE,
JOHN M. C. SMITH.